US009996748B2

(12) United States Patent
Way et al.

(10) Patent No.: US 9,996,748 B2
(45) Date of Patent: Jun. 12, 2018

(54) EMITTER TRACKING SYSTEM (71) Applicant: FLIR Systems, Inc., Wilsonville, OR (US)

(72) Inventors: Scott Way, West Linn, OR (US); Cynthia I. Archer, Sherwood, OR (US)

(73) Assignee: FLIR Systems, Inc., Wilsonville, OR (US)

( * ) Notice: Subject to any disclaimer, the term of this patent is extended or adjusted under 35 U.S.C. 154(b) by 463 days.

(21) Appl. No.: 13/967,213

(22) Filed: Aug. 14, 2013

(65) Prior Publication Data

US 2015/0363646 A1    Dec. 17, 2015

Related U.S. Application Data

(63) Continuation of application No. 12/490,562, filed on Jun. 24, 2009, now abandoned.

(60) Provisional application No. 61/076,049, filed on Jun. 26, 2008.

(51) Int. Cl.
| | | |
|---|---|---|
| G06K 9/00 | (2006.01) |
| F41G 7/30 | (2006.01) |
| F41G 7/00 | (2006.01) |
| F41G 7/32 | (2006.01) |
| G06T 5/50 | (2006.01) |

(Continued)

(52) U.S. Cl.
CPC ........... *G06K 9/00664* (2013.01); *F41G 7/00* (2013.01); *F41G 7/303* (2013.01); *F41G 7/32* (2013.01); *G06K 9/4661* (2013.01); *G06T 5/50* (2013.01); *G06T 7/20* (2013.01); *G06T 2207/30212* (2013.01)

(58) Field of Classification Search
CPC ... F41G 7/00; F41G 7/303; F41G 7/32; G06T 5/50; G06T 7/20; G06T 2207/30212; G06K 9/00664; G06K 9/4661
See application file for complete search history.

(56) References Cited

U.S. PATENT DOCUMENTS 4,710,028 A * 12/1987 Grenier .................. G01S 3/784
                                                244/3.11
5,147,088 A    9/1992 Smith et al.
(Continued)

FOREIGN PATENT DOCUMENTS

CA    2729172 A1    4/2010
CN    102132290 A    7/2011
(Continued)

OTHER PUBLICATIONS

EPO office action in corresponding application 09820937.2 dated Mar. 14, 2013.*
(Continued)

*Primary Examiner* — Katrina Fujita
(74) *Attorney, Agent, or Firm* — Haynes and Boone, LLP (57) ABSTRACT

An improved emitter tracking system. In aspects of the present teachings, the presence of a desired emitter may be established by a relatively low-power emitter detection module, before images of the emitter and/or its surroundings are captured with a relatively high-power imaging module. Capturing images of the emitter may be synchronized with flashes of the emitter, to increase the signal-to-noise ratio of the captured images.

18 Claims, 2 Drawing Sheets

(51) Int. Cl.
*G06T 7/20* (2017.01)
*G06K 9/46* (2006.01)

(56) References Cited

U.S. PATENT DOCUMENTS

| | | | |
|---|---|---|---|
| 5,332,176 A * | 7/1994 | Wootton | G01S 3/7864 |
| | | | 244/3.11 |
| 5,687,930 A | 11/1997 | Wagner et al. | |
| 5,884,294 A | 3/1999 | Kadar et al. | |
| 5,991,428 A | 11/1999 | Taniguchi | |
| 6,654,482 B1 | 11/2003 | Parent et al. | |
| 7,456,754 B1 * | 11/2008 | Haynes | F21V 23/00 |
| | | | 340/815.4 |
| 7,732,769 B2 | 6/2010 | Snider et al. | |
| 8,022,343 B2 | 9/2011 | Solenne | |
| 2002/0106107 A1 | 8/2002 | MacDonald | |
| 2002/0154293 A1 | 10/2002 | Wells et al. | |
| 2002/0176605 A1 | 11/2002 | Stafsudd et al. | |
| 2006/0159307 A1 | 7/2006 | Anderson et al. | |
| 2006/0181479 A1 | 8/2006 | Mantese et al. | |
| 2007/0125951 A1 | 6/2007 | Snider et al. | |
| 2009/0324015 A1 | 12/2009 | Way et al. | |

FOREIGN PATENT DOCUMENTS

| | | |
|---|---|---|
| EP | 2304643 A1 | 4/2011 |
| FR | 2908874 A1 | 5/2008 |
| WO | 2010044927 A1 | 4/2010 |

OTHER PUBLICATIONS

EPO office action in corresponding application 09820937.2 dated Jun. 26, 2014.*
EPO office action in corresponding application 09820937.2 dated Jun. 29, 2015.*
EPO office action in corresponding application 09820937.2 dated Jan. 27, 2016.*
Young, Lee W., Authorized officer, International Searching Authority, International Search Report, International Patent Application No. PCT/US2009/48502; search completion date: Mar. 1, 2010; dated Mar. 10, 2010; 2 pages.
Young, Lee W., Authorized officer, International Searching Authority, Written Opinion of the International Searching Authority, International Patent Application No. PCT/US2009/48502; opinion completion date: Mar. 1, 2010; dated Mar. 10, 2010; 6 pages.
Pakistan Patent Office, Examination Report, Pakistani Patent Application No. 578/2009; dated May 12, 2011; 1 page.
European Patent Office, Extended European Search Report, (counterpart) European Patent Application Serial No. 09820937.2; search date: Feb. 1, 2012; dated Feb. 14, 2012; 6 pages.
"First Office Action" in connection with corresponding Chinese Application No. 200980132013.1, dated Aug. 29, 2012, 10 pages.
Pakistan Patent Office, Examination Report, Pakistani Patent Application No. 578/2009; dated Oct. 11, 2012; 1 page.
European Patent Office, Examination Report, (counterpart) European Patent Application Serial No. 09820937.2; dated Mar. 14, 2013; 6 pages.
"Second Office Action" in connection with corresponding Chinese Application No. 200980132013.1, dated Jun. 27, 2013, 7 pages.
European Patent Office, Examination Report, (counterpart) European Patent Application Serial No. 09820937.2; dated Jun. 26, 2014; 6 pages.
Canadian Intellectual Property Office, "Office Action" in connection with related Canadian Patent Application No. 2,729,172, dated Feb. 10, 2015, 3 pages.

* cited by examiner

EMITTER TRACKING SYSTEM

CROSS-REFERENCES

This application is a continuation of U.S. patent application Ser. No. 12/490,562, filed Jun. 24, 2009, which in turn is based upon and claims the benefit under 35 U.S.C. § 119(e) of U.S. Provisional Patent Application Ser. No. 61/076,049, filed Jun. 26, 2008. Each of these priority documents is incorporated herein by reference in its entirety for all purposes.

INTRODUCTION

Satellites, missiles, and other self-propelled or independently propagating devices often are tracked remotely for various purposes. For example, in the case of a communications satellite, it may be desirable to send and receive narrow directional signals to and from the satellite, and, to do so efficiently, the position of the satellite must be known with precision. Similarly, in the case of a global-positioning satellite, the position of the satellite must be known precisely if it is to serve its purpose as a precision locator of ground-based objects. In the case of a guided missile, such as a tube-launched, optically tracked, wire-guided (TOW) missile, knowing the position of the missile precisely may allow desirable in-flight course corrections.

To facilitate precision measurements of the position of objects such as those described above, the object may be equipped with a beacon that emits a signal having known properties. Using these properties, a "signal detection system" or non-imaging system may be configured to detect the particular signature of the beacon, and to activate an imaging system to determine the position of the beacon with a desired amount of precision. The position information obtained in this manner may be used to direct signals to and/or from the moving object, to correct the trajectory of the object as needed, and/or for any other purpose. Furthermore, the imaging system employed for tracking also may be used to obtain more general images of the moving object and its surroundings, such as images of an intended target area. This can provide desirable situational awareness beyond mere tracking information.

An example of a prior art beacon tracking system utilizing an array of detectors is disclosed in U.S. Pat. No. 6,469,783 to Wells et al., which is hereby incorporated herein by reference for all purposes. However, existing beacon tracking systems, such as the system of Wells et al., as well as those relying on various scanning techniques, may suffer from a number of shortcomings. These include, for example, poor image quality, inherent latencies leading to time-delayed images, relatively high power consumption, and/or moving parts that may require maintenance and/or have a propensity for malfunction. For these and other reasons, an improved emitter tracking system is desirable.

SUMMARY

The present disclosure relates to an improved emitter tracking system. In aspects of the present teachings, the presence of a desired emitter may be established by a relatively low-power emitter detection module, before images of the emitter and/or its surroundings are captured with a relatively high-power imaging module. Capturing images of the emitter may be synchronized with flashes of the emitter, to increase the signal-to-noise ratio of the captured images.

DETAILED DESCRIPTION

The present disclosure relates to an improved emitter tracking system. This system may be solid state (i.e., have no moving parts), relatively small, and/or consume relatively little power. This system also may allow tracking over longer ranges, in comparison with many existing beacon tracking systems, and/or include a camera that can be used for relatively high quality generic imaging. These system attributes, individually or in combination, may provide, at least in the exemplary case of TOW missile tracking, improved situational awareness and target area imaging, without the latency of scanning, and thus lead to more accurate targeting. More generally, the presently disclosed system may, for example, be adapted for use with missile trackers, vehicle trackers, target identifiers, Identify Friend and Foe (IFF) systems, laser communication systems, optical communication systems, and/or optical cell phone communication systems, among others.

Figure 1:
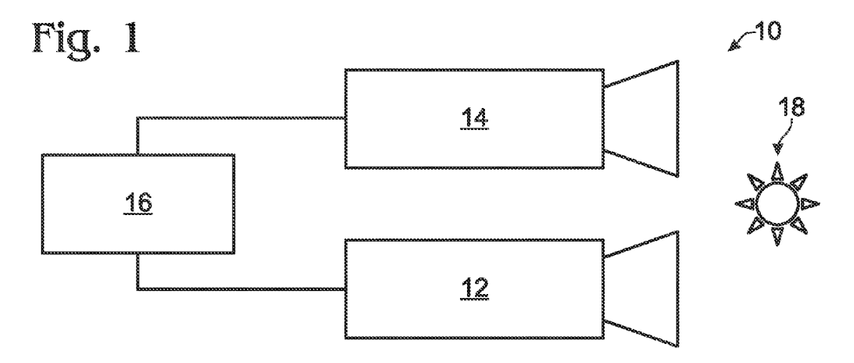
FIG. 1 is a schematic block diagram of a first exemplary tracking system, according to aspects of the present teachings.

FIG. 1 shows a schematic block diagram of a first exemplary emitter tracking system 10, in accordance with aspects of the present disclosure. This exemplary tracking system includes a signal detection module 12, an imaging module 14, and a processor 16 that controls the signal detection and imaging modules and analyzes image data obtained therefrom. Signal detection module 12 is generally configured to detect an emitter signal generated by an emitter. More specifically, the signal detection module may be used in conjunction with processor 16 to detect an electronic signature emitted from within the field of view of the signal detection module, for example, from a beacon or other emitter 18 attached to or otherwise associated with a satellite, missile, or other moving object.

The terms "beacon" and "emitter" are used in this disclosure to mean an apparatus configured to facilitate tracking an object by emitting electromagnetic radiation having known and/or recognizable properties or signatures. The signatures may include, for example, a signal emitted at a particular wavelength and/or flashing at a particular frequency or in a particular pattern. The flashing pattern may be regular (i.e., emitted at a well-defined frequency), or it may be coded to contain information about the signal emitter and/or to facilitate positively identifying the signature of the emitter. To identify a signature, signal detection module 12 may be a relatively low-power module, by utilizing relatively low power components such as a photocell or a photodiode. A more specific example of an appropriate signal detection module is provided below with reference to FIG. 2.

Signal detection module 12, upon positive identification of an optical signature, may send an appropriate signal to processor 16, to activate imaging module 14. Imaging module 14 is generally configured to capture images of the emitter upon receiving an activation signal. The imaging module may have substantially the same field of view as the signal detection module and be configured to capture two-dimensional images of the field of view identified by the signal detection module as containing an emitter having a known or positively identified electronic signature. Alternatively, the imaging module may have a substantially larger field of view than the signal detection module, to capture images of both an emitter and at least a portion of its surroundings. In some embodiments, the imaging module may be configured to be activated (and thus to consume substantial power) only once an appropriate emitter has been identified. This may reduce power consumption, relative to the amount required by systems in which a two-dimensional imaging module both identifies an electronic signature and captures images.

Alternatively, the signal detection module may be used both to identify an emitter signature and to synchronize ("generator lock" or "genlock") the imaging module to the emitter, allowing the imaging module to capture images at times when the emitter is known to be in an "on" or an "off" state. This allows the convenient subtraction of successive images of the emitter, to remove unwanted background image noise, as will be described below in more detail. To capture images, the imaging module may include, for example, a charge-coupled device (CCD) upon which images are focused by one or more optical elements such as lenses, mirrors, or aperture stops. A more specific example of an appropriate imaging module is provided and described below with reference to FIG. 2.

Processor 16 is generally configured to receive the detected emitter signal from the signal detection module, analyze the emitter signal, and transmit an activation signal to the imaging module under appropriate circumstances. Typically, the processor will be configured to transmit the activation signal to the imaging module only if the emitter signal includes a predetermined signature, indicating that a particular desired emitter has been detected. For example, the processor may be configured to extract a flashing frequency profile (i.e., the flashing frequency as a function of time) from a beacon signal, compare the extracted profile to a desired profile, and transmit the activation signal to the imaging module if the extracted profile substantially matches the desired profile. In addition to triggering activation of imaging module 14, processor 16 may use information received from the signal detection module, such as the flashing frequency profile or pattern of a detected emitter, to activate the imaging module in a particular manner. For example, based on the detected emitter pattern, the processor may be configured to synchronize the imaging module with the emitter signal.

More specifically, the processor may be configured to cause the imaging module to capture sequential images of the emitter as the emitter alternates between an emissive state and a non-emissive state. In other words, the processor may be configured to signal the imaging module to capture sequential images, one with the emitter "on" (i.e., emitting a flash of light), and one with the emitter "off" (i.e., not emitting a flash). The "on" and "off" states, or equivalently the emissive and non-emissive states, refer only to the flashes of radiation corresponding to the emitter signal; the emitter still may be emitting some electromagnetic radiation when in an "off" or non-emissive state.

Capturing sequential images of the emitter as the emitter alternates from an emissive state to a non-emissive state may be conveniently accomplished by synchronizing, or "gen-locking," the imaging module with the emitter signal using the data received by the signal detection module, as mentioned previously. The processor then may be configured to construct a subtracted image by electronically subtracting a first image of the emitter in a non-emissive state from a second image of the emitter in an emissive state, to eliminate background image noise and to improve the signal-to-noise ratio of the resultant subtracted image. The processor also may be configured to construct one or more additional subtracted images and to construct a combined subtracted image by electronically adding two or more of the subtracted images. This may further improve the signal-to-noise ratio in the combined subtracted image. With or without such additional combination, the processor then may use the resultant images to determine the location of the signal emitter (e.g., a moving beacon), and/or may be configured to send the resultant images to another processor for tracking purposes.

The emitter tracking system disclosed herein generally may include any suitable optics, filters, detectors, and/or other components. Suitable optics (or optical elements) for the imaging module of an emitter tracking system may include, for example, (1) reflective elements (such as mirrors), (2) refractive elements (such as lenses), (3) transmissive or conductive elements (such as fiber optics or light guides), (4) diffractive elements (such as gratings), and/or (5) subtractive elements (such as filters or aperture stops), among others. In a given embodiment, some of these elements, such as the filters, may be optical, electronic, or both. For example, the signal detection module may include various optical or electronic filters configured to filter out various signals that are known in advance not to correspond to a desired emitter. Specifically, the signal detection module may include a filter configured to filter out electromagnetic radiation having wavelengths outside a desired range, or a filter configured to filter out signals having a flashing frequency profile insufficiently correlated to the known signature of the emitter to be tracked, among others.

Suitable detectors for an imaging module may include, for example, (1) array detectors, such as charge-coupled devices (CODs), charge-injection devices (CIDs), complementary metal-oxide semiconductor (CMOS) arrays, photodiode arrays, and the like, and/or (2) arrays of point detectors, such as photomultiplier tubes (PMTs), photodiodes, pin photodiodes, avalanche photodiodes, photocells, phototubes, and the like. Detectors may be sensitive to the intensity, wavelength, polarization, and/or coherence of the detected imaging energy, among other properties, as well as spatial and/or temporal variations thereof. The signal detection module also may incorporate solid state elements such as photodiodes or photocells, to function reliably and without excessive power consumption, which as noted previously is one advantage of separating signal detection from imaging.

The fields of view of the signal detection module and the imaging module may or may not be the same, as mentioned above, although the field of view of the imaging module will typically include the field of view of the signal detection module. In some cases, however, the signal detection module may have a first, relatively small field of view sufficient to detect the emitter signal, and the imaging module may have a second field of view substantially larger than the first field of view, so that the imaging module can capture images of the emitter and also at least a portion of the emitter's surroundings. These differing fields of view may be provided by different types of sensors. For instance, the signal detection module may include a photodiode or photocell configured to receive image data from the first, smaller field of view, whereas the imaging module may include a focal plane array of detectors (such as a staring array) configured to receive image data from the second, larger field of view.

In some embodiments, an emitter tracking system according to the present disclosure may be capable of detecting and/or generating image signals based on two or more different types or wavebands of received image data. For example, an emitter may be configured to emit infrared radiation, in which case signal detection module 12 of FIG. 1 may be configured to detect infrared radiation, or to detect both visible and infrared radiation. More generally, an emitter may be configured to emit radiation in any suitable wavelength regime(s), and the signal detection module may be configured to detect radiation from at least such regime(s). Alternatively, or in addition, imaging module 14 of FIG. 1 may be configured to detect radiation in the particular regime emitted by the emitter, as well as visible and/or infrared radiation. The imaging module thus may be configured to generate any or all of the following images, which in some embodiments may be combined or simultaneously displayed: (1) an image of a detected emitter, (2) a visible image of the field of view surrounding the emitter, and/or (3) an infrared image of the field of view surrounding the emitter.

More generally, the signal detection and imaging modules of an emitter tracking system may be used with any suitable set of first and second (or first, second, and third (and so on)) image signals, using any suitable wavelength bands. These suitable image signals may include first and second visible wavebands, first and second infrared wavebands, mixtures of visible, infrared, and/or ultraviolet wavebands, and so on, depending on the application. For example, visible light may be used to generate an image signal that in turn may be used to create a photograph or movie showing how a scene appears to a human observer. In contrast, infrared radiation may be used to generate an image signal that in turn may be used to create a heat profile showing heat intensity information for a scene. Furthermore, in some examples, an imaging module may form composite images. The composite images may be straight combinations of two or more other images. However, in some cases, one or both of the images may be processed prior to or during the process of combining the images. Composite images may be formed for use in firefighting, aeronautics, surveillance, and/or the like, for example, by superimposing infrared images of hot spots, runway lights, persons, and/or the like on visible images.

Figure 2:
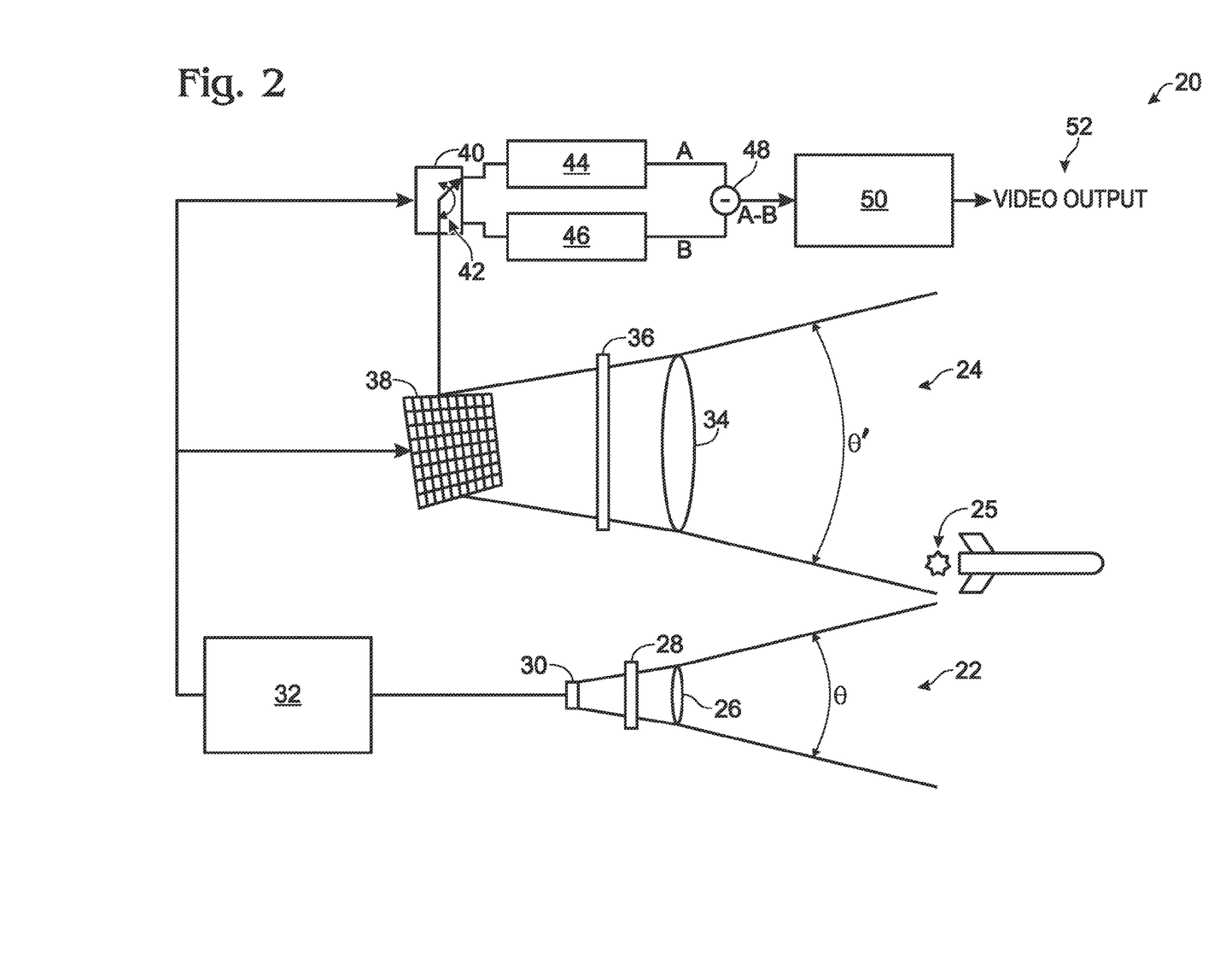
FIG. 2 is a schematic block diagram of a second exemplary tracking system, according to aspects of the present teachings.

FIG. 2 shows a schematic diagram of a second exemplary emitter tracking system 20, in accordance with aspects of the present disclosure. This exemplary system includes a signal detection module 22, an imaging module 24, and electronics for switching between and/or processing signals or images collected from the two modules. The signal detection and imaging modules each may include (1) imaging optics for collecting radiation and forming an image, (2) one or more optical filters for modifying properties of the radiation prior to image formation, and/or (3) a detector for capturing the image and forming an image signal. In general, signal detection module 22 is configured to detect a beacon (or other emitter) signature, and imaging module 24 is configured to be activated and to capture images of an emitter 25 and its surroundings (potentially including a desired target area) upon detection of a desired signature by the signal detection module.

An emitter to be detected may be stationary or mobile relative to the tracking system, depending on whether the tracking system, the emitter, or both are mobile. In the embodiment depicted in FIG. 2, emitter 25 is a beacon associated with a missile, such as a TOW missile, to be tracked by the tracking system. The intensity, wavelength(s), and/or other properties of the radiation emitted by the emitter may be selected and/or varied to facilitate its detection or separation from the background scene. For example, the emitted radiation may flash on and off, especially at a high frequency, or otherwise vary in intensity. Optionally, this flashing or variation may be coded to contain additional information and/or to prevent unauthorized tracking. Furthermore, the emitter typically will be configured to emit light only at particular wavelengths, again to allow better recognition of the emitter signal. For example, a gas such as xenon or a discrete laser may be used in the emitter to emit radiation having a well defined frequency or spectrum of frequencies.

Signal detection module 22 includes imaging optics 26, an optical filter 28, and a detector 30, as depicted in FIG. 2. Detector 30, in the pictured embodiment, is a photodiode having a field of view (θ) sufficient to capture image data from a scene including an emitter that emits a signal having a known electronic signature. The signal detection module may continuously view the scene and thus capture the flashing rate and other image data emitted by an emitter within its field of view. The signal to the photodiode, or more generally to detector 30, may be optically filtered at optical filter 28 to reject items that are not of the same wavelength (and/or that do not possess the same other optical properties) as the signal emitted by an emitter of interest, and/or may be electronically filtered at an electronic bandpass filter 32 to reject sources of the same wavelength that do not have the proper flashing rate or coding rate. Electronic filter 32 may be integrated with signal detection module 22, or it may be a separate component that receives signals from the signal detection module.

Imaging module 24 includes imaging optics 34, an optical filter 36, and a detector 38, also as shown in FIG. 2. Detector 38, in this embodiment, is a high-speed charge-coupled device (CCD) imaging device having a field of view (θ') that is at least substantially similar to the field of view of detector 30 of signal detection module 22. In general, however, the detector of the imaging module may have a different field of view than the detector of the signal detection module, to capture two-dimensional images of a scene that includes the detected emitter, as well as any desired amount of the emitter's surroundings.

The imaging device of the imaging module may not capture images indiscriminately, but rather in some embodiments may be activated only if the signal detection module detects an emitter, as described previously. Furthermore, the imaging module may be synchronized or "genlocked" with the emitter frequency detected by the signal detection module. In the embodiment depicted in FIG. 2, signal detection module 22 and imaging module 24 each are in electronic communication with a processor 40 for these purposes.

Processor 40 may, for example, be configured to receive filtered signals from the signal detection module and to evaluate whether a particular signal represents detection of a desired emitter signature. For instance, the processor may be programmed to recognize a particular signature or set of signatures correlated to emitters of one or more particular known types. Upon determining that a desired emitter signature has been detected, processor 40 may send an activation signal to imaging module 24, so that module 24 will commence capturing images of the scene including the detected emitter. Upon receipt of a filtered signal having the proper signature to be recognized as an emitter, imager 38 of FIG. 2 may be triggered to take consecutive exposures of the scene. One such exposure may be taken with the emitter on, and a subsequent exposure may be taken with the emitter off, or vice versa. Alternatively or in addition, processor 40 may be configured to use frequency data received by the signal detection module to synchronize the images captured by the imaging module with the emitter signal. This may allow more convenient addition or subtraction of images received at the imaging module, for the purposes of enhancing a resulting composite image or series of images as described below.

Tracking system 20 may include a switch, such as an electronic switch generally indicated at 42, which alternately sends the emitter-on and emitter-off images to separate image storage locations 44 and 46. As noted previously, the orientation of the switch may depend on frequency data received by the signal detection module. Each emitter-off frame may be subtracted from a consecutively obtained emitter-on frame to eliminate any background clutter, as is generally indicated at 48 in FIG. 2. After subtraction, the resultant frame contains substantially only the emitter signal, thus improving the signal-to-noise ratio of the resultant image relative to an image with no similar background subtraction. Furthermore, subsequent resultant frames can be integrated together, to improve the signal-to-noise ratio even further, as indicated by the presence of an electronic integrator 50 in FIG. 2. The resultant frame, or the integration of multiple resultant frames, may be sent to a processor, such as a video tracker, configured to determine the relationship between the emitter and the track point, and to generate error signals that may be processed by a guidance computer (such as a missile guidance computer) for the purposes of guiding the tracked object to its target, or for any other purpose, as indicated at 52 in FIG. 2.

Emitter tracking systems according to the present disclosure may be used in various applications aside from TOW missile tracking. These include, for example, militarized gimbals, a variety of other imaging modules needing to track an emitter, and communications modules needed to track an emitter without accurate pointing knowledge. According to the present teachings, various aspects of the disclosed emitter tracking systems may be employed in such applications, either individually or in combination. These aspects include, for example, use of a two-dimensional imager with synchronous detection of an emitter operating at frame rates above the emitter frequency, use of a separate photodiode to synchronize the two-dimensional imager, frame subtraction to eliminate background noise, optional display of the detected image to provide situational awareness, and/or use of large focal plane array to provide a wide field of view to the two-dimensional imager.

EXAMPLES

The following examples describe selected aspects and embodiments of the present teachings. These examples and the various features and aspects thereof are included for illustration and are not intended to define or limit the entire scope of the present teachings.

Example 1

This example relates to and further describes emitter tracking incorporating image subtraction, according to aspects of the present teachings. As described previously, once the presence and characteristic signal of an emitter has been detected, a processor may electronically subtract an emitter-off image from an emitter-on image, to eliminate background image noise and to improve the signal-to-noise ratio of the resultant subtracted image. The simplest way to accomplish this is for the imaging module to capture a single one-half period of the emitter signal for each image, corresponding to capturing one image with the emitter on, and one with the emitter off. Subtracting the emitter-off image from the emitter-on image results in an image of the emitter with relatively little background noise.

Alternatively, the system could be configured to capture and integrate multiple emitter-on and emitter-off images. For example, the imaging module could capture and integrate a composite "emitter-on" image consisting of two and one-half periods of the emitter signal, corresponding to three emitter-on images and two emitter-off images. The system could then capture and integrate a composite "emitter-off" image consisting of a different (e.g., temporally adjacent) two and one-half periods of the emitter signal, corresponding to two emitter-on images and three emitter-off images. Subtracting the composite "emitter-off" image from the composite "emitter-on" image again results in an image of the emitter with relatively little background noise. In addition, integrating each composite image over several cycles of the emitter may have certain advantages. For example, any error due to inexact synchronization of the imaging module with the emitter will be spread out over several cycles of the emitter. Similarly, any other inconsistencies or errors in either the emitter signal or the imaging module will be spread out over several emitter cycles. When this is the case, the subtracted image may more accurately represent an image of the emitter. More generally, the system could construct an emitter image by integrating over any suitable numbers of cycles, for example, subtracting an "emitter-off" image obtained by measuring N emitter-on images and N+1 emitter-off images from an "emitter-on" image obtained by measuring N+1 emitter-on images and N emitter-off image, where N=2, 3, or 4, among others.

Example 2

This example relates to and further describes emitter tracking incorporating coded emitters, according to aspects of the present teachings. As described previously, an emitter signal may be coded to contain information about the signal emitter and/or to facilitate positively identifying the signature of a particular emitter. When an emitter tracking system seeks to track a coded emitter, the system may perform several steps in conjunction with, or prior to, capturing image data for display or tracking purposes. First, an emitter tracking system according to the present teachings may perform the preliminary step of extracting the emitter "pulse rate" or "clock" from the received emitter signal. Because this signal may, for example, include missing pulses and/or have an irregular frequency, characterizing the received signal with a processor may be necessary or desirable.

Once an incoming emitter signal has been received and characterized with a "pulse rate" or other defining characteristic of a coded emitter signal, a comparison with a desired emitter signal can be performed. This involves matching the code of the desired signal with the code of the received signal. Because the phase of the incoming signal may not be known, comparison of the received signal with the desired signal may require incrementally adjusting the phase of one of the two signals (i.e., the desired signal or the incoming signal), and correlating the desired code with the received emitter code for each incremental phase possibility. For example, the phase of the desired signal may be adjusted while the correlation of the signals is measured. Alternatively, the phase of the incoming signal may be adjusted and the resulting signal compared with the desired signal. In any case, based on correlations found by comparing the two signals, a determination can be made as to whether or not a desired coded emitter has been located. If a desired emitter is positively identified, the correlated code may be used to stay phase locked to the emitter signal.

Example 3

This example relates to and further describes exemplary methods of tracking an emitter, according to aspects of the present teachings.

Figure 3:
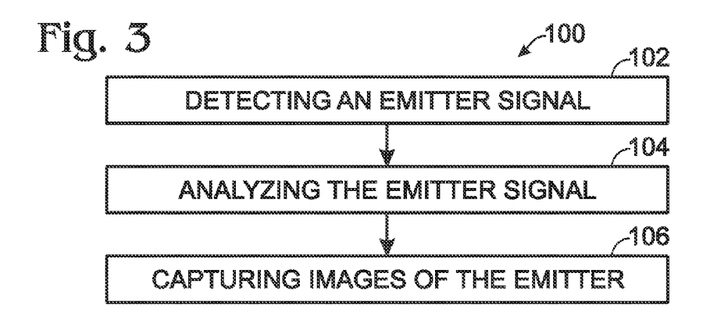
FIG. 3 is a flowchart depicting an exemplary emitter tracking method, according to aspects of the present teachings.

FIG. 3 is a flowchart depicting a first exemplary method, generally indicated at 100, of tracking an emitter according to aspects of the present teachings. Method 100 generally includes a step 102 of detecting an emitter signal, a step 104 of analyzing the signal to determine if the signal includes a signature corresponding to a particular emitter, and a step 106 of capturing images of the emitter. Generally, step 106 will be performed only if the detected emitter signal includes the desired signature, so that the power and other resources associated with capturing images need not be expended unless a desired emitter, which may be one of a predefined set, has been positively identified.

Detecting an emitter signal may be performed with a signal detection module, analyzing the detected signal may be performed with a processor, and capturing images of the emitter may be performed with an imaging module. Suitable signal detection modules, processors, and imaging modules include those described previously with respect to FIGS. 1 and 2. As noted above, the signal detection module and imaging module may have different fields of view, which may be provided by different types of sensors. Thus, detecting the emitter signal may include receiving the emitter signal at a signal detection module having a first field of view, and capturing images of the emitter may include receiving image data at an imaging module having a second field of view substantially larger than the first field of view and including at least a portion of the emitter's surroundings. For example, the signal detection module may include a photodiode configured to receive image data from the first, relatively smaller field of view, and the imaging module may include a focal plane array configured to receive image data from the second, relatively larger field of view.

In some cases, detecting an emitter signal may include filtering out various incoming signals, to decrease the necessary analysis of the received signals and to decrease the possibility of capturing images unnecessarily. For example, step 102 may include filtering out electromagnetic radiation having wavelengths outside a desired range, and/or filtering out signals having a flashing frequency profile insufficiently correlated to the desired signature of an emitter to be tracked, among others. Filtering may be optical and/or electronic, and may be performed in conjunction with signal detection (as just described), or as a separate step either before or after signal detection.

Step 104 of analyzing the signal generally includes any form of analysis sufficient to determine whether the signal corresponds to a particular beacon or other emitter to be tracked. Typically this analysis involves determining if the emitter signal includes a particular signature, which is the signature known to be emitted by the sought after emitter. Determining this may include extracting a flashing frequency profile from the signal and comparing the extracted profile to a desired profile. Both the extracted profile and the desired profile (corresponding to an emitter to be tracked) may be periodic with a well-defined frequency, or the frequency profiles may include frequencies that change over time in some fashion, which may be beneficial for encoding the emitter signal to make the emitter more difficult for an unauthorized party to track.

Capturing images according to step 106 may be synchronized with the flashing frequency profile of the emitter signal, which can be captured and recorded during step 102 and/or step 104. When the image capturing step is synchronized with the emitter flashes, step 106 may, for example, include capturing sequential images of the emitter as the emitter alternates between an emissive state and a non-emissive state, i.e., between an emitter "on" state and an emitter "off" state.

Figure 4:
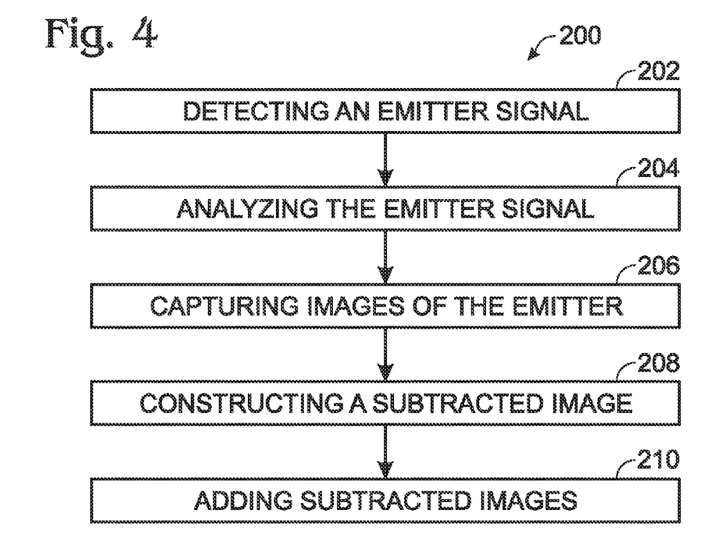
FIG. 4 is a flowchart depicting another exemplary emitter tracking method, according to aspects of the present teachings.

FIG. 4 is a flowchart depicting a second exemplary method, generally indicated at 200, of tracking an emitter according to aspects of the present teachings. Method 200 generally includes a step 202 of detecting an emitter signal, a step 204 of analyzing the signal to determine if the signal includes a signature corresponding to a particular emitter, and a step 206 of capturing images of the emitter. These steps are similar to steps 102, 104 and 106 of method 100, and will not be described again in detail.

Method 200 also includes a step 208 of constructing a subtracted image by electronically subtracting a first image of the emitter in a non-emissive state from a second image of the emitter in an emissive state. As described previously, this can improve the signal-to-noise ratio of the received signal by subtracting away a substantial portion of the received image data other than the emitter signal itself.

Constructing a subtracted image according to step 208 may involve subtracting one composite image from another, rather than simply subtracting one image frame from another. In other words, the image of the emitter in a non-emissive state may itself be a composite image, as may be the image of the emitter in an emissive state. For example, integrating image data over an odd number of half periods of the emitter cycle may be a suitable way of forming composite images. If the integration is started when the emitter is in an emissive state, then the emitter will again be in an emissive state an odd number of half periods later (e.g., on-off-on-off-on), so that the integration results in a composite emissive image. Similarly, if the integration is started when the emitter is in a non-emissive state, then the emitter will again be in a non-emissive state an odd number of half periods later, and the integration will result in a composite non-emissive image (e.g., off-on-off-on-off). Constructing composite images in this manner may help to reduce errors by spreading them over multiple flashing periods of the emitter.

Furthermore, step 208 may include constructing more than one subtracted image, whether the images to be subtracted are single image frames or composite integrated images. For example, step 208 may include constructing a second subtracted image by electronically subtracting a third image of the emitter in a non-emissive state from a fourth image of the emitter in an emissive state. When multiple subtracted images are constructed in this manner, an additional step of electronically adding the subtracted images may be performed as indicated at 210. As in the case of constructing composite images to be subtracted, constructing composite images by combining them after subtraction again may serve to improve the signal-to-noise ratio of the final constructed images.

The disclosure set forth above may encompass multiple distinct inventions with independent utility. The disclosure relates information regarding specific embodiments, which are included for illustrative purposes, and which are not to be considered in a limiting sense, because numerous variations are possible. The inventive subject matter of the disclosure includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

We claim:

1. An emitter tracking system, comprising:
   a signal detection module including imaging optics, an optical filter, and a first detector, such that the signal detection module is configured to detect an emitter signal generated by an emitter, the emitter signal including a plurality of flashes;
   an imaging module including a second detector and one or more optical elements, such that the imaging module is configured to capture images of the emitter upon receiving an activation signal; and
   a processor configured to receive the emitter signal from the signal detection module, analyze the emitter signal, and transmit the activation signal to the imaging module only if the emitter signal includes a predetermined pattern of flashes, the predetermined pattern being defined by "on" and "off" states of the emitter as a function of time;
   wherein the predetermined pattern of flashes is coded by changing the "on" and "off" pattern over time to prevent unauthorized tracking, and
   wherein the processor is configured to synchronize the imaging module with the emitter signal, such that the imaging module captures images at times when the emitter is known to be in an "on" state.

2. The system of claim 1, further comprising the processor is configured to cause the imaging module to selectively capture images of the emitter in a non-emissive state.

3. The system of claim 2, wherein the processor is configured to construct a first subtracted image by electronically subtracting a first image of the emitter in the non-emissive state from a second image of the emitter in the emissive state.

4. The system of claim 3, wherein the processor is configured to construct a second subtracted image by electronically subtracting a third image of the emitter in the non-emissive state from a fourth image of the emitter in the emissive state, and to construct a combined subtracted image by electronically adding the first and second subtracted images.

5. The system of claim 1, wherein the signal detection module includes a filter configured to filter out electromagnetic radiation having wavelengths outside a desired range.

6. The system of claim 1, wherein the optical filter of the signal detection module is configured to filter out signals having a pattern of flashes insufficiently correlated to the predetermined pattern of flashes.

7. The system of claim 1, wherein the signal detection module has a first field of view and the imaging module has a second field of view substantially larger than the first field of view, the first field of view is sufficient to detect the emitter signal, and the second field of view is sufficient to capture images of the emitter and at least a portion of the emitter's surroundings.

8. The system of claim 7, wherein the first detector of the signal detection module includes a photodiode configured to receive image data from the first field of view, and the second detector of the imaging module includes a focal plane array configured to receive image data from the second field of view.

9. The system of claim 1, wherein the processor is configured to extract a flashing rate profile from the plurality of flashes of the emitter signal, compare the extracted profile to a desired profile, and transmit the activation signal to the imaging module only if the extracted profile substantially matches the desired profile.

10. A method of tracking an emitter, the method comprising:
    detecting an emitter signal comprising a plurality of flashes;
    analyzing the signal to determine if the signal includes a predetermined pattern of flashes corresponding to a particular emitter, the predetermined pattern of flashes being defined by "on" and "off" states of the emitter signal as a function of time; and
    capturing images of the emitter only if the signal includes the predetermined pattern of flashes;
    wherein the predetermined pattern of flashes is coded by changing the predetermined pattern of flashes over time to prevent unauthorized tracking, and
    wherein the step of capturing images of the emitter is synchronized with the flashes of the emitter signal, such that images are captured at times when the emitter is known to be in an "on" state.

11. The method of claim 10, wherein the step of capturing images of the emitter further comprises a step of selectively capturing images of the emitter in a non-emissive state.

12. The method of claim 11, further comprising constructing a first subtracted image by electronically subtracting a first image of the emitter in the non-emissive state from a second image of the emitter in the emissive state.

13. The method of claim 12, further comprising constructing a second subtracted image by electronically subtracting a third image of the emitter in the non-emissive state from a fourth image of the emitter in the emissive state, and electronically adding the first and second subtracted images.

14. The method of claim 10, wherein detecting the emitter signal includes filtering out electromagnetic radiation having wavelengths outside a desired range.

15. The method of claim 10, wherein detecting the emitter signal includes filtering out signals having a pattern of flashes insufficiently correlated to the predetermined pattern of flashes.

16. The method of claim 10, wherein detecting the emitter signal includes receiving the emitter signal at a signal detection module having a first field of view, and wherein capturing images of the emitter includes receiving image data at an imaging module having a second field of view substantially larger than the first field of view and including at least a portion of the emitter's surroundings.

17. The method of claim 16, wherein the signal detection module includes a photodiode configured to receive image data from the first field of view, and wherein the imaging module includes a focal plane array configured to receive image data from the second field of view.

18. The method of claim 10, wherein analyzing the signal includes extracting a flashing rate profile from the signal and comparing the extracted profile to a desired profile.

\* \* \* \* \*

UNITED STATES PATENT AND TRADEMARK OFFICE
CERTIFICATE OF CORRECTION

| | |
|---|---|
| PATENT NO. | : 9,996,748 B2 |
| APPLICATION NO. | : 13/967213 |
| DATED | : June 12, 2018 |
| INVENTOR(S) | : Scott Way and Cynthia I. Archer |

It is certified that error appears in the above-identified patent and that said Letters Patent is hereby corrected as shown below:

In the Detailed Description:

In Column 4, Line 40, change "(CODs)" to --(CCDs)--.

Signed and Sealed this
Thirty-first Day of July, 2018

Andrei Iancu
*Director of the United States Patent and Trademark Office*